United States Patent [19]
Tanaka et al.

[11] Patent Number: 5,339,366
[45] Date of Patent: Aug. 16, 1994

[54] METHOD FOR THE INPUT OF A TRACE STARTING POINT OF AN IMAGE

[75] Inventors: Yutaka Tanaka; Naruto Takasaki, both of Yokohama, Japan

[73] Assignee: Hitachi Software Engineering Co., Ltd., Yokohama, Japan

[21] Appl. No.: 753,993

[22] Filed: Sep. 3, 1991

[30] Foreign Application Priority Data

Sep. 3, 1990 [JP] Japan .................. 2-232664

[51] Int. Cl.$^5$ .............................................. G06K 9/30
[52] U.S. Cl. .............................. 382/22; 382/60
[58] Field of Search ............... 382/22, 60; 345/203, 345/12, 16

[56] References Cited

U.S. PATENT DOCUMENTS

| | | | |
|---|---|---|---|
| 3,366,794 | 1/1968 | Alvarez | 382/60 |
| 3,671,937 | 6/1972 | Takahashi et al. | 382/60 |
| 3,987,412 | 10/1976 | Morrin, II | 382/60 |
| 4,321,682 | 3/1982 | Koshikawa | 382/60 |

*Primary Examiner*—Leo H. Boudreau
*Attorney, Agent, or Firm*—Fay, Sharpe, Beall, Fagan, Minnich & McKee

[57] ABSTRACT

An image processing device has an image memory for storing image data, a semi-automatically trace processing for tracing line images of the image data by entering a trace starting point of the image data and an instruction to start tracing, and a display input unit for giving an instruction to enter on a display screen, thereby starting tracing the line images of the image data from the trace starting point thereof. In the method for entering the trace starting points, the image of the image data to be traced is displayed on the display screen through the display input unit, a line segment for specifying the trace starting points thereof is entered so as to intersect the line image displayed on the display screen, an intersecting point at which the line segment therefor intersects the line image is determined, and the resulting intersecting point is entered as a trace starting point, together with an instruction to start tracing.

30 Claims, 7 Drawing Sheets

METHOD FOR THE INPUT OF A TRACE STARTING POINT OF AN IMAGE

BACKGROUND OF THE INVENTION

The present invention relates to a method for the input of a trace starting point of an image and, more particularly, to a method for the input of a trace starting point of an image, so adapted as to enter the trace starting point of the image with high efficiency in order to allow a CAD (a computer-aided design) machine, etc. to take effective advantage of a semi-automatically image-trace processing function for semi-automatically tracing a continuous pixel sequence of image data.

Heretofore, the method for the input of a drawing drawn on paper into an image processing system generally comprises inputting of the drawing as image data by an image scanner or the like, displaying the image data on a display screen by an image processing system, and allowing the operator to enter a continuous pixel sequence of the image manually through a pointing device while looking at the display screen.

For example, Japanese Patent Laid-open Publication (kokai) No. 269,276/1987 discloses a method of the input of a drawing in a conversational mode, which comprises entering the drawing into a computer system as image data through a scanner, superimposing the resulting image data on center-line image data, and entering the drawing as vector data representing the drawing with coordinate points by specifying necessary positions of the drawing on the display screen with a coordinate pointer.

For example, when the image data is converted into graphic data such as vector data, etc. as described hereinabove, central data on the center or the center line of the image is given, data on necessary characteristic points of the continuous image, such as end points, branch points, corner points, etc. is selected and specified from the central data, and such data is entered. In this case, in order to enter the characteristic points, the central data is superimposed on the image data on the display screen to allow the operator to judge the characteristic points with ease, and the characteristic points are entered manually by the operator. Hence, this input method suffers from the disadvantage that the display screen becomes so complex that the operator cannot select the necessary data with high efficiency.

On the other hand, there has been developed an image processing device with a semi-automatically image-trace processing function that traces a line image of image data, i.e. a continuous pixel sequence thereof, in a semi-automatic fashion, determines the characteristic points, and enters the graphic data of the characteristic points. It is to be noted herein that an instruction to enter a point on the line image to be traced is entered by specifying a point on the line image by employing such a semi-automatically image-trace processing function of the image processing device.

However, the conventional image processing device with the semi-automatically image-trace processing function does not pay much attention to the fact that the trace starting point of the image to be traced is entered with efficiency in the trace processing of the continuous pixel sequence of the image data. Hence, all of the trace starting points of the line image to be traced should be specified and entered one after another by setting the accurate positions of the points on the line image with an input device such as a pointing device or the like. This input operation is extremely laborious.

SUMMARY OF THE INVENTION

Therefore, the object of the present invention is to provide a method for the input of a trace starting point of an image for an image processing device so adapted as to enter the trace starting point of the image with high efficiency in order to take effective advantage of a semi-automatically image-trace processing function for tracing the continuous pixel sequences of the image data in a semi-automatic way.

In order to achieve the aforesaid object, the present invention consists of a method for the input of a trace starting point of an image for an image processing device for starting tracing the line image of the image data from the trace starting point thereof, which has an image memory for storing image data, a semi-automatically image-trace processing section for tracing a line image of the image data in a semi-automatic way, and a display input unit having a display screen disposed and arranged so as to specify and enter the trace starting point thereof and an instruction to start a trace on the display screen of the display input unit, comprising: displaying an image of the image data to be traced on the display screen by the input unit; entering a line segment for specifying the trace starting point thereof so as to intersect the line image displayed on the display screen; determining an intersecting point at which the line segment for specifying the trace starting point thereof intersects the line image; and entering the intersecting point as a trace starting point and the instruction to start tracing.

When the semi-automatically image-trace processing section in the image processing device enters the trace starting point of the line image of the image data and the instruction to start tracing and the processing for tracing the line image of the image data is started by specifying the trace starting point thereof, the image data to be traced is displayed on the display screen through the display input unit and the line segment for specifying the trace starting point thereof is entered so as to intersect the line images on the display of the image data. As the line segment for specifying the trace starting point is entered, the intersecting point of the line image intersecting the line segment therefor is determined and the resulting intersecting point is entered as the trace starting point, together with the instruction to start the trace.

As described hereinabove, the method for the input of the trace starting point according to the present invention allows the inputting of the trace starting point of the line image to be performed as the line segment for specifying the trace starting point intersecting the line image to be traced, not as points, so that it is unnecessary to specify the points on the line image in an accurate way yet it is possible to ensure the accurate input of the trace starting points of the line images. Further, a plurality of the trace starting points thereof can be specified and entered simultaneously. Hence, it is no more required to give the instruction to start the trace for each line image and this can reduce laborious work for specifying the trace starting points to an extraordinary extent.

Further objects, features and advantages of the present invention will become more clear from the following detailed description of a preferred embodiment, shown in the accompanying drawings, wherein:

DESCRIPTION OF THE PREFERRED EMBODIMENTS

Figure 1:
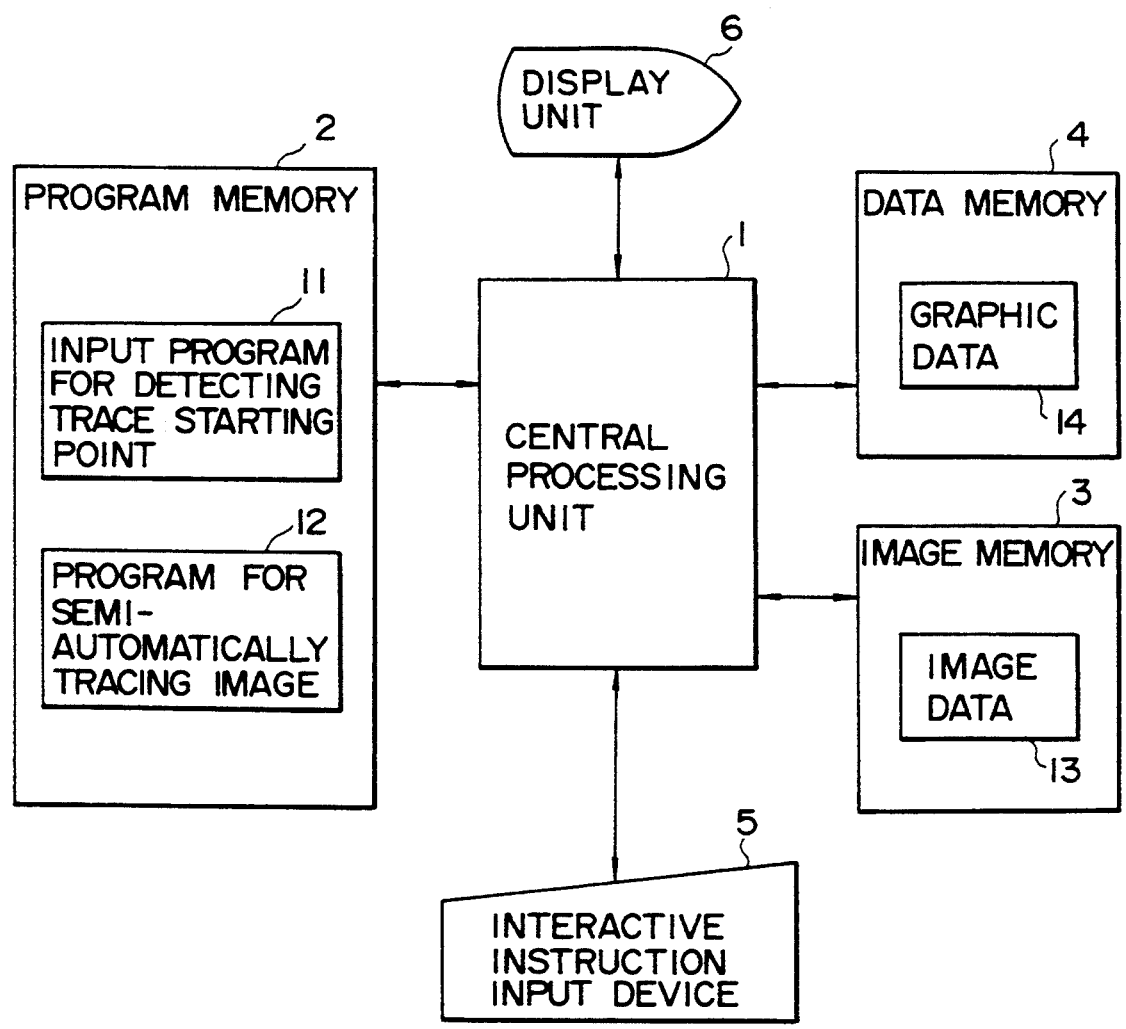
FIG. 1 is a block diagram showing the configuration of the image processing device for an embodiment of the present invention.

FIG. 1 shows the configuration of the image processing device according to an embodiment of the present invention. The image processing device comprises a central processing unit 1 for performing various processing, a program memory 2 for storing programs necessary for processing to be implemented by the central processing unit 1, an image memory 3, a data memory 4, an interactive instruction input device 5, and a display unit 6 for displaying data on its display screen.

The program memory 2 stores an input prograte 11 for detecting a trace starting point and a program 12 for semi-automatically tracing an image. In the image memory 3 is stored image data 13 as the object for tracing. The data memory 4 stores graphic data 14, such as trace starting point data, digitized vector graphic data, etc. for image processing.

The input program 11 for detecting the trace starting point stored in the program memory 2 reads the image data 13 by the processing operation of the central processing unit 1, detects the trace starting point for a line image of the image data 13 to be traced, and enters the trace starting point detected into the program 12 for tracing an image in a semi-automatic way. The program 12 for semi-automatically tracing the image performs the semi-automatic tracing of the line image for the image data 13 on the basis of the trace starting point detected by and entered from the input program 11 for detecting the trace starting point. The vector graphic data as the result of tracing is stored in the data memory 4 as graphic data 14. These processes are started by an instruction to operate by the interactive instruction input device 5 and the result of image processing is displayed on the display unit 6.

Figure 2:
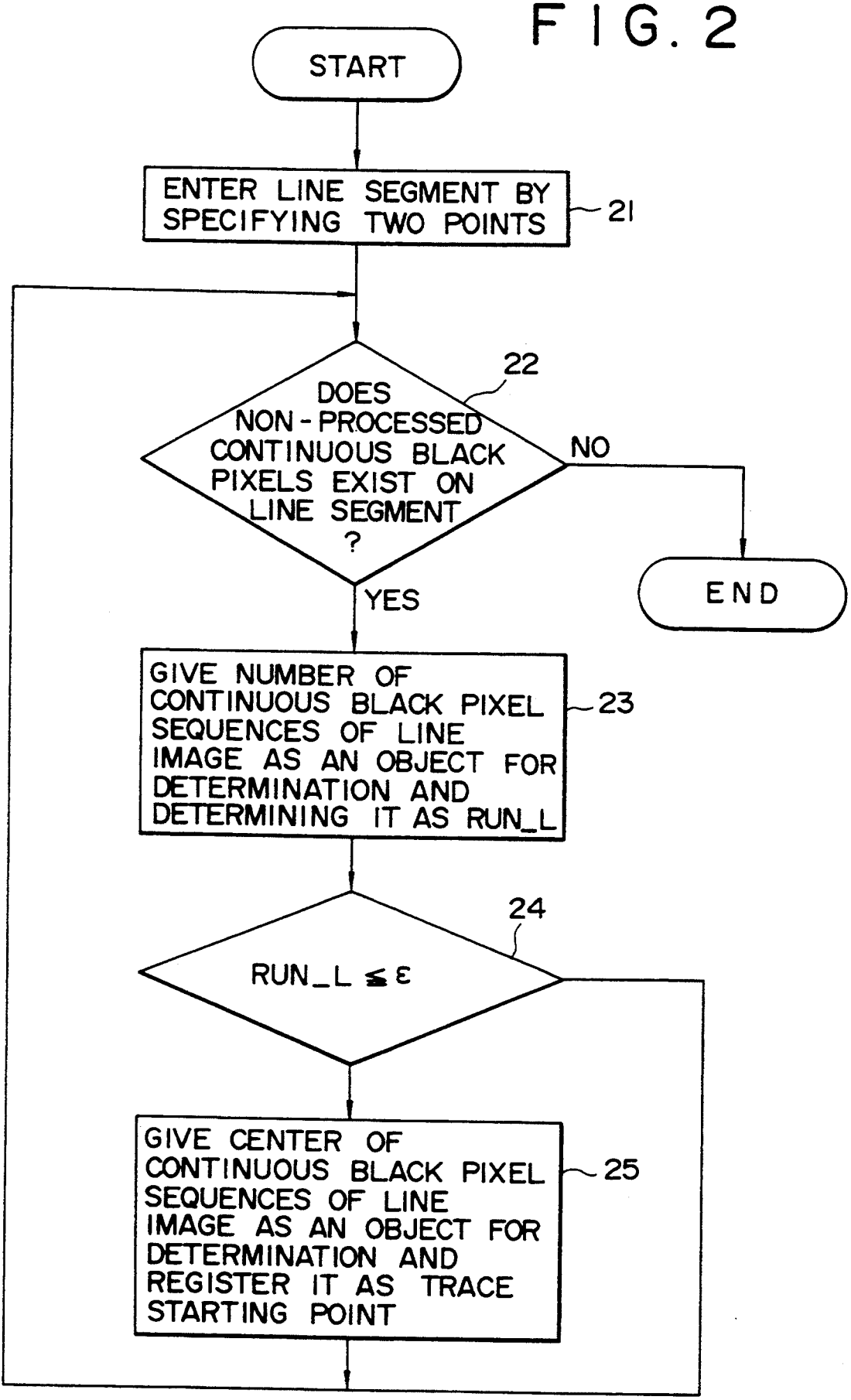
FIG. 2 is a flow chart showing a sequence of the processing for detecting the trace starting point.
Figure 3:
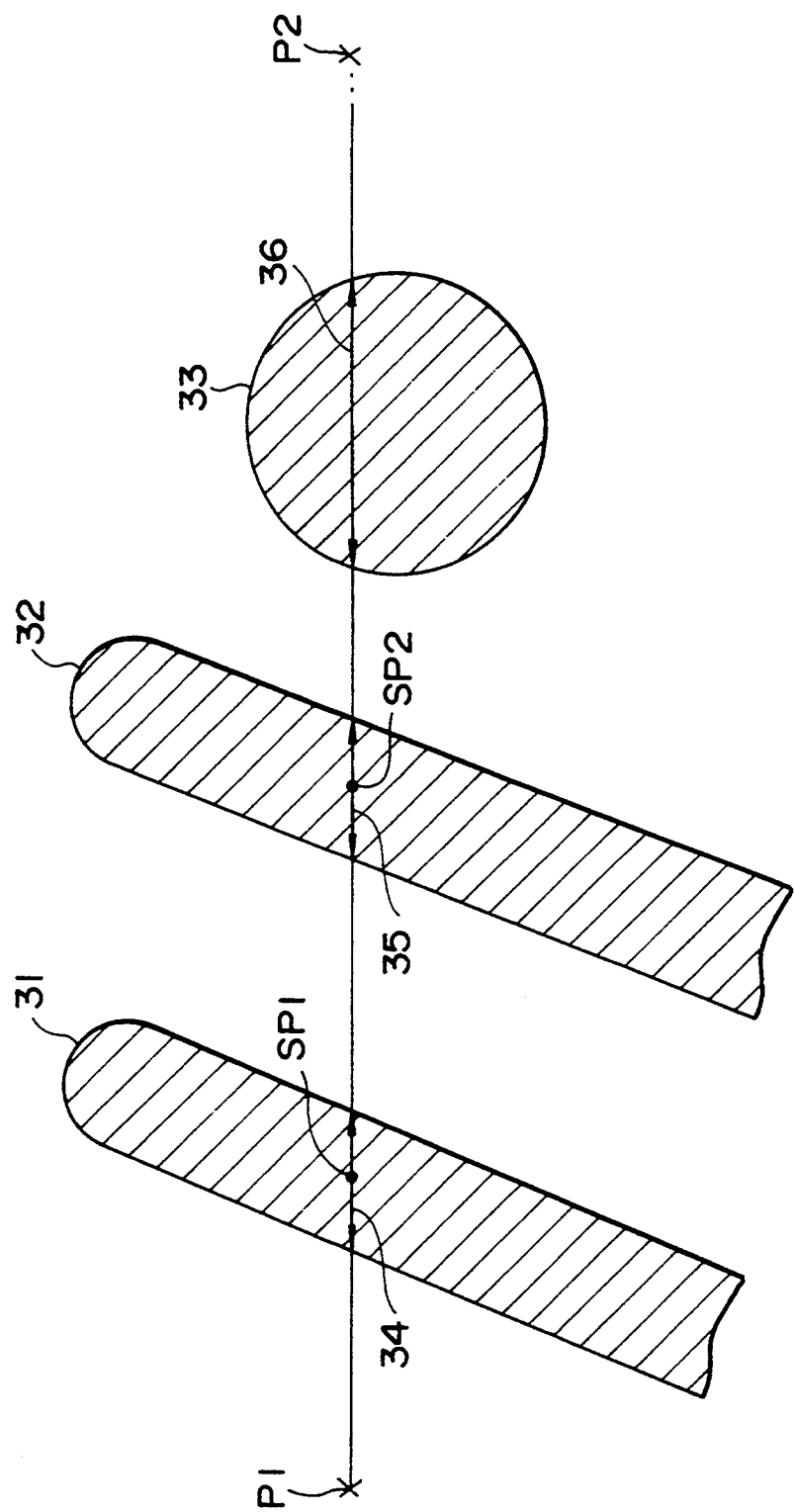
FIG. 3 is a schematic illustration for describing a decision for determining the trace starting point of the line image by the processing for detecting the trace starting point thereof.

FIG. 2 is the flow chart showing the process for detecting the trace starting point. FIG. 3 is a schematic diagram for describing the principle of determining the trace starting point by the processing for detecting the trace starting point. Description will now be made of the process for detecting the trace starting point with reference to FIGS. 2 and 3. When the line image of the image data 13 to be traced is displayed on the display screen of the display unit 6 in an enlarged fashion as shown in FIG. 3, there may be shown images such as line images 31 and 32 of plural black pixel sequences and an image region 33 of a black pixel area. In order to give an instruction to trace those images as displayed, an instruction to specify the trace starting points SP1 and SP2 for the respective line images 31 and 32 is entered to start the tracing. More specifically, the operator enters a line segment for specifying the trace starting points intersecting the line images displayed on the display screen, i.e. a line segment connecting and passing through points P1 and P2. By entering the line segment for specifying the trace starting points, the trace starting points are detected as intersecting points of the line segment with the line images 31 and 32. And the intersecting points determined are entered as trace starting points SP1 and SP2, together with an instruction to start the tracing.

Figure 7:
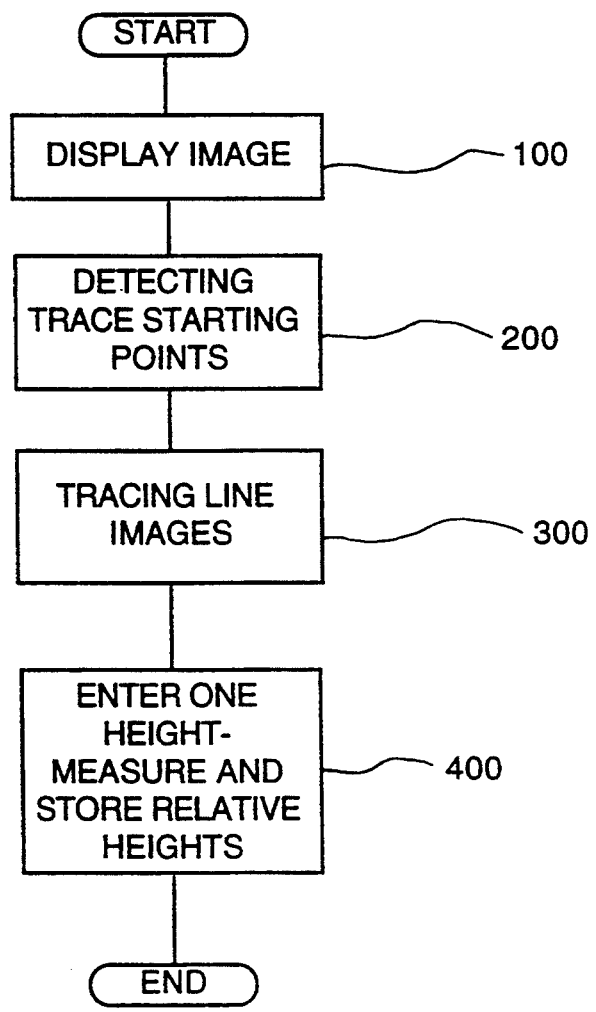
FIG. 7 is a flow chart showing the processing of FIG. 2 within an overall image processing method.

Referring to FIG. 2, after the line image to be traced from the image data has been displayed, according to step 100 of FIG. 7, then the program flow goes to step 200 of FIG. 7 starting with step 21 at which a line segment is entered by specifying two points. For instance, as shown in FIG. 3, two points P1 and P2 are specified to thereby enter the line segment so as to intersect the line images 31 and 32 for which the respective trace starting points are located.

Then, at step 22 determines if non-processed and continuous black pixels exist on the line segment connecting the two points entered. When it is decided at step 22 that the continuous black pixels exist, on the one hand, then the program flow goes to step 23 to determine if there is a point where the line segment intersects the line image. When the result of step 22 indicates that no continuous black pixels exist, on the other hand, the processing is ended because no intersecting point exists.

In the processing at step 23, the number of a sequence of the continuous black pixels of the intersection between the line segment and an image is given as RUN_L (run-length number). Then, step 24 determines if the value of RUN_L is larger than a predetermined line width clearance value $\epsilon$. When it is decided at step 24 that the value of RUN_L is larger than the predetermined line width clearance value $\epsilon$, then the program flow is returned to step 22 at which the processing is performed for the next sequence of intersecting pixels black pixel, because no line image was found for the black pixel sequence which was just processed in steps 23 and 24. When the result of a decision at step 24 indicates that the value of RUN_L is equal to or smaller than the predetermined line width clearance value $\epsilon$, then the program flow goes to step 25 because it was determined that the black pixel sequence has intersecting points of the line image to be traced. At step 25, the central point of the black pixel sequence is given and registered as the trace starting point. Then, the program flow is returned to step 22 for processing the next black pixel sequence. The coordinate points which have been determined and registered as the trace starting points are stored as the graphic data 14 in the data memory 4.

For the image as shown in FIG. 3, there are three continuous black pixel sequences such as route 34, route 35 and route 36 on the path extending between the points P1 and P2 (from step 21) as determined by step 22 as intersections between the line segment and image. As shown in FIG. 3, it is determined in step 24 (after determining the number of black pixels in the routes by step 23) that each of the route 34 of the line image 31 and the route 35 of the line image 32 has an intersecting point between the line segment P1, P2 and a line image and then the central point is given for each of the routes of the line images 31, 32 and they are then registered as the trace starting points SP1 and SP2, respectively by step 25. For the route 36 of the image region 33, it is determined that the value of RUN_L is larger than the line width clearance value $\epsilon$ so that the image containing route 36 is determined not to be a line image and as a consequence no intersecting point exists. The program for semi-automatically tracing of the images in accordance with step 300 starts tracing the line images 31 and 32 on the basis of the trace starting points SP1 and SP2, respectively, of the graphic data 14 stored in the data memory 4 according to the process at step 25 of FIG. 2.

The process for detecting the trace starting points in the manner as described hereinabove allows the trace starting points to be specified for a group of line images parallel to each other by specifying and entering one line segment, thereby minimizing the laborious work for specifying the trace starting points.

Figure 4:
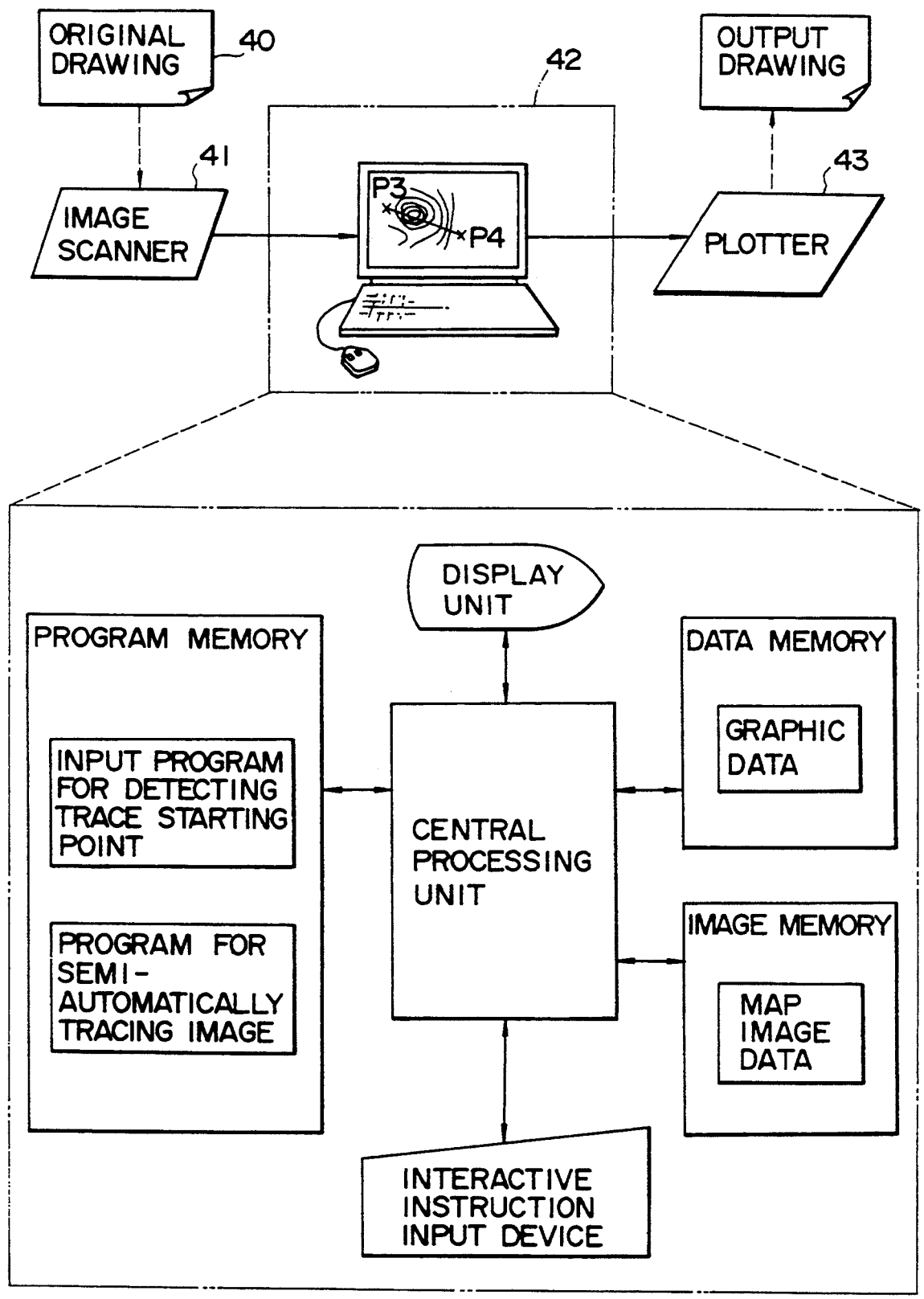
FIG. 4 is a system diagram showing the configuration of a map image processing system for processing map data by the image processing device to which the method for the input of the trace starting point according to the embodiment of the present invention is applied.

FIG. 4 shows the configuration of a map image processing system for processing map data by the image processing for the input of the trace starting points according to the embodiment of the present invention. The map image processing system comprises an image scanner 41 for fetching an original drawing 40 of a map image as image data, an image processing unit 42 for processing the image data, and a plotter 43 for generating the image-processed image data and the graphic data. The image processing unit 42 is provided with an input program for detecting the trace starting points and a program for semi-automatically tracing the trace starting points, and there is employed the image processing unit (FIGS. 1 and 2) that can enter the trace starting points by entering the line segment for specifying the trace starting points. The trace processing of each of contour line images of the map image can be started semi-automatically by entering an instruction to start tracing the plural trace starting points efficiently by entering the line segment for specifying the trace starting points.

Figure 5:
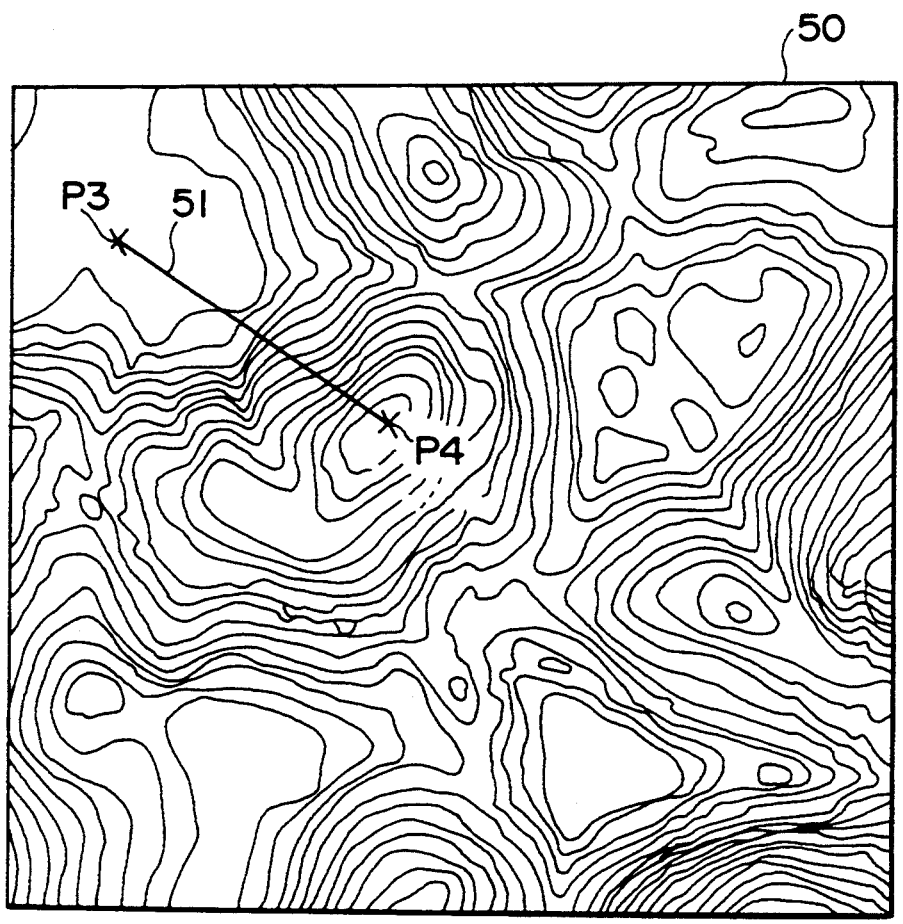
FIG. 5 is a schematic illustration showing an example of the map image which is image-processed by the map image processing system.

FIG. 5 shows an example of the map image to be image-processed by the map image processing system according to the embodiment of the present invention. When the map image composed of groups of line images of contour lines as shown in FIG. 5 is processed by the map image processing system, the original drawing 40 of a contour line map is read out by the image scanner 41 and stored as image data of the image memory. Then, the image data is read out from the image memory and displayed on the display screen (step 100), and two points P3 and P4 are specified on the map image 50 of the display screen by a pointing device to enter a line segment 51 for specifying the trace starting points, as shown in FIG. 5, in order to enter the trace starting points for the contour lines of the line image to be traced. By entering the line segment 51, the image processing unit 42 starts its input program (step 200) for detecting the trace starting points, determines the intersecting points of the contour lines intersecting the line segment 51 in order of the contour lines, and detects the trace starting points in order in the direction extending from the starting point P3 to the end point P4. The resulting intersecting points for the trace starting points of the contour lines are stored in the data memory temporarily and then given in order to the program for semi-automatically tracing the image (step 300), thereby tracing the line images of the contour lines in their order. In tracing the line images of the contour lines from the trace starting points given in order, the line images (contour lines) traced are provided with an attribute of height and the contour lines map is converted into vector graphic data having the attribute of height (step 400). In this case, height attribute data can be set for the contour lines serving as references and height automatically determined by X meter increments for the contour lines traced in order thereof.

As described hereinabove, the graphic data of the contour line map can be converted into the vector graphic data having the height attribute by tracing the contour lines in order. As the resulting vector graphic data has the attribute of height, shape of the geographical configuration of the ground represented by the map can readily be displayed by taking advantage of the vector graphic data of the map drawing.

Figure 6A:
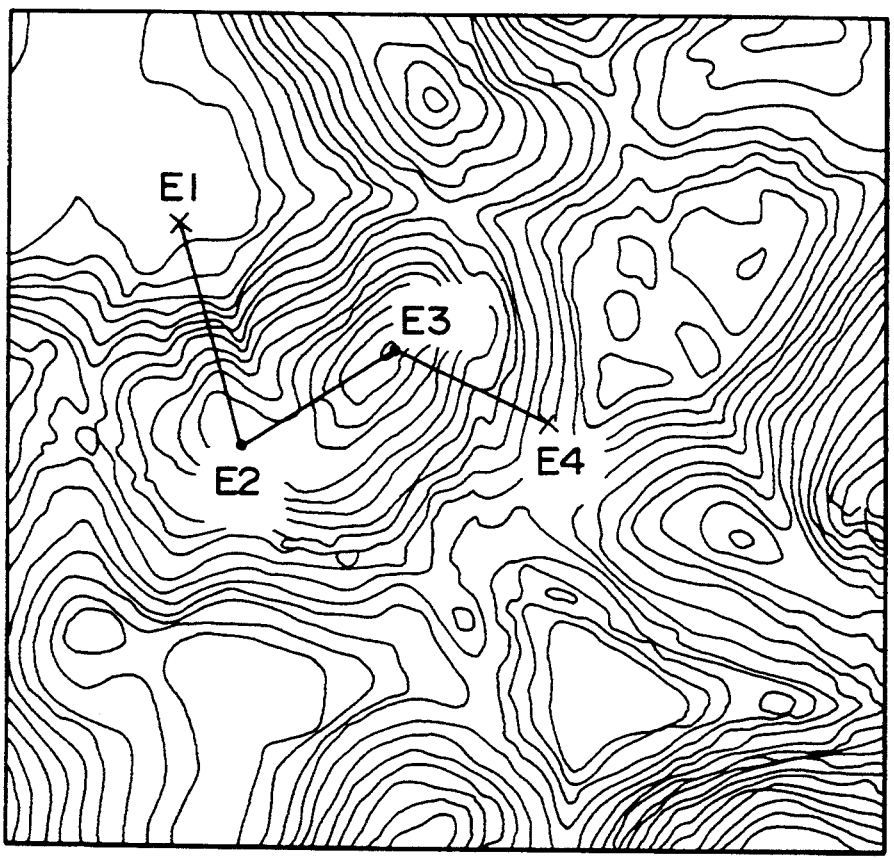
FIGS. 6a and 6b are schematic illustrations showing an example in which vector graphic data of a map graph having height attribute data is utilized.
Figure 6B:
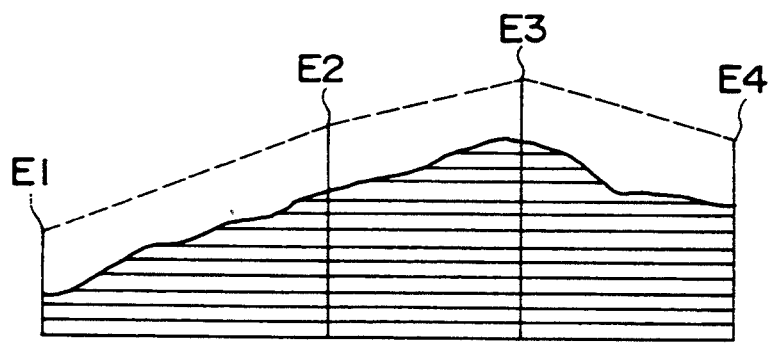

FIGS. 6a and 6b show an example which takes advantage of the vector graphic data of the map drawing having the attribute of height. For example, as shown in FIG. 6a, representation of the contour lines of the map graphic is displayed on the display screen. Appropriate points E1, E2, E3 and E4 are set and a sectional graphic of the configuration of the ground can be displayed on the display screen along the line connecting each of the points El, E2, E3 and E4 as shown in FIG. 6b. By readily displaying the shape of the configuration of the ground as shown in FIG. 6b on the display screen, this system can conveniently be applied, for example, to a design for disposing power-transmission towers because it is readily possible to determine concave and convex portions of the ground at sites where the power-transmission towers are to be built.

As described hereinabove, the present invention allows the trace starting points to be entered with certainty without requirements for specifying points on the line image in an accurate way because the trace starting points of the line images are entered by entering the line segment for intersecting the line images to be traced, without specifying all the trace starting points in a conventional manner. Further, this present invention permits a plurality of trace starting points to be specified and entered at the same time. Furthermore, the present invention does not require the trace starting points to be specified for each line image, thereby remarkably reducing laborious work for specifying the trace starting points.

While a preferred embodiment has been set forth along with modifications and variations to show specific advantageous details of the present invention, further embodiments, modifications and variations are contemplated within the broader aspects of the present invention, all as set forth by the spirit and scope of the following claims.

What is claimed is:

1. A method of operating an image processing device for tracing a line image of image data, which device has an image memory for storing the image data, a semi-automatic image-trace processing section, a display, and an input unit to specify and enter a trace starting point and an instruction to start the tracing, the method comprising:

displaying the line image of the image data on the display;

entering a line segment to intersect the line image;

automatically determining an intersecting point at which the line segment intersects the line image;
entering the intersecting point as the trace starting point;
entering the instruction to start the tracing; and
thereafter automatically tracing the line image using the trace starting point.

2. A method as claimed in claim 1, wherein there are a plurality of line images;
said determining automatically determines a plurality of intersecting points at a plurality of the intersections at which the line segment intersects the line images, respectively; and
said step of entering the intersecting points enters trace starting points in order of the line images in a direction in which the line segment is entered.

3. A method as claimed in claim 1, wherein said step of determining includes discriminating between a line image and another non-line image according to whether a continuous region of intersection is equal to or smaller than a line width clearance value of the line image, and if so the center of the region is determined as the intersecting point and is specified as a trace starting point.

4. An image processing device, comprising:
an input unit for the input of a line segment to determine a trace starting point;
an image memory for storing image data;
a semi-automatic image-trace processing section for automatically tracing a line image of the image data when instructed and set with a trace starting point;
a display input unit having a display screen disposed and arranged so as to specify entry of the line segment and an instruction to start a trace on the display screen;
said image-trace processing section starting the trace of the line image from the entered trace starting point in response to entry of the instruction; and
a control processing unit for controlling the processing of the semi-automatic image-trace processing section for tracing the line image upon entry of the trace starting point and instruction to start a trace.

5. An image processing device as claimed in claim 4, wherein the image memory stores the image data as map data having plural contour line images; and including means to calculate height attribute data in accordance with an order of the contour line images as traced.

6. A method for tracing an image represented by image data and including one or more line images, comprising:
providing an image processing device having an image memory for storing the image data, a semi-automatic image-tracing processing section that will automatically trace line images upon entry of a trace starting point for each line image, a display for displaying the image, and an input unit for assisting a user in inputting instructions including an instruction to start tracing and data for determining the trace starting point;
displaying the image on the display;
user defining an arbitrarily located line segment on the display;
entering the line segment and a user initiated start instruction;
in response to entry of the start instruction and entry of the line segment, automatically determining black pixels of the image along the line segment as one or more continuous black pixel sequences;
discriminating which ones of the continuous black pixel sequences represent respective portions of line images for selecting line image continuous black pixel sequences;
automatically determining the trace starting point for each of the line image continuous black pixel sequences; and
thereafter automatically tracing each line image by using a corresponding one of the starting points.

7. A method for tracing an image according to claim 6, wherein said step of user defining includes manually determining the line segment location on the image by the user.

8. A method for tracing an image according to claim 6, wherein said step of discriminating includes comparing a length of each continuous black pixel sequence to a fixed reference length and determining the sequence to be a portion of a line image if the determined length is less than the fixed reference length and not a portion of a line image if the determined length is greater than the reference length.

9. A method for tracing an image according to claim 6, wherein said step of determining the trace starting point determines the starting point for each line image continuous black pixel sequence as the location of substantially the center of the continuous black pixel sequence.

10. A method for tracing an image according to claim 6, wherein said step of displaying display a contour map having a plurality of separate topographical contour lines representing respective line images; and said step of determining a line segment places the line segment to intersect a plurality of the contour lines.

11. A method for tracing an image according to claim 1, wherein said step of user defining fixes the line segment as a straight line segment in a plane common with the image on the display.

12. A method for tracing an image according to claim 1, wherein said step of user defining determines the line segment to be of finite length to only partially extend across the image.

13. A method for tracing an image according to claim 1, wherein said step of user defining sets graphical data representing a start point and a stop point for the line segment.

14. A method for tracing an image according to claim 1, wherein said step of tracing includes replacing the image data of the line images traced with graphic data.

15. A method for tracing an image according to claim 10, including entering a height attribute for at least one of the contour lines;
automatically measuring the distance between traced lines within an image plane relative to the one of the contour lines and setting a height attribute to each traced line image based upon such distance and height attribute; and
storing graphic data of the traced contour lines together with a height attribute for each.

16. A method for tracing an image according to claim 7, wherein said step of determining a line segment fixes the line segment as a finite length straight line segment to only partially extend across the image in a plane common with the image on the display;
said step of defining the line segment sets graphical data representing a start point and a stop point for the line segment; and
said step of tracing includes replacing the image data of the line images traced with graphic data.

17. A method for tracing an image according to claim 16, wherein said step of discriminating includes comparing a length of each continuous black pixel sequence to a fixed reference length and determining the sequence to be a portion of a line image if the determined length is less than the fixed reference length and not a portion of a line image if the determined length is greater than the reference length.

18. A method for tracing an image according to claim 16, wherein said stp of determining the trace starting point determines the starting point for each line image continuous black pixel sequence as the location of substantially the center of the continuous black pixel sequence.

19. A method for tracing an image according to claim 16, wherein said step of displaying displays a contour map having a plurality of separate topographical contour lines representing respective line images; and said step of determining a line segment places the line segment to intersect a plurality of the contour lines.

20. A method for tracing an image according to claim 19, including entering a height attribute for at least one of the contour lines;
automatically measuring the distance between traced lines within an image plane relative to the one of the contour lines and setting a height attribute to each traced line image based upon such distance and height attribute; and
storing graphic data of the traced contour lines together with a height attribute for each.

21. A method for tracing an image according to claim 20, wherein said step of discriminating includes comparing a length of each continuous black pixel sequence to a fixed reference length and determining the sequence to be a portion of a line image if the determined length is less than the fixed reference length and not a portion of a line image if the determined length is greater than the reference length.

22. A method for tracing an image according to claim 20, wherein said step of determining the trace starting point determines the starting point for each line image continuous black pixel sequence as the location of substantially the center of the continuous black pixel sequence.

23. A method for tracing an image according to claim 22, wherein said step of discriminating includes comparing a length of each continuous black pixel sequence to a fixed reference length and determining the sequence to be a portion of a line image if the determined length is less than the fixed reference length and not a portion of a line image if the determined length is greater than the reference length.

24. An apparatus for tracing an image represented by image data and including one or more line images, comprising:
an image memory for storing the image data;
a semi-automatic image-tracing processing section that will automatically trace line images upon entry of a trace staring point for each line image;
a display for displaying the image;
an input unit for assisting a user in inputting instructions including an instruction to start tracing and data for defining an arbitrarily located line segment on the display for determining the trace starting point;
responsive to entry of the start instruction and entry of the line segment, for automatically determining black pixels of the image along the line segment as one or more continuous black pixel sequences;
means for discriminating which ones of the continuous black pixel sequences represent respective portions of line images for selecting line image continuous black pixel sequences;
means for automatically determining the trace starting point for each of the line image continuous black pixel sequences;
said section including means for thereafter automatically tracing each line image by using a corresponding one of the starting points; and
means for setting graphic data representing a start point and a stop point for the line segment.

25. An apparatus for tracing an image according to claim 24, wherein said means for discriminating includes means for comparing a length of each continuous black pixel sequence to a fixed reference length and determining the sequence to be a portion of a line image if the determined length is less than the fixed reference length and to a portion of a line image if the determined length is greater than the reference length.

26. An apparatus for tracing an image according to claim 24, wherein said means for automatically determining the trace starting point determines the starting point for each line image continuous black pixel sequence as the location of substantially the center of the continuous black pixel sequence.

27. A method for tracing an image according to claim 6, wherein said step of displaying displays a plurality of separate line images;
said step of determining a line segment places the line segment to intersect a plurality of the lines images;
said step of defining the line segment sets graphic data representing a start point and a stop point for the line segment; and
said step of tracing includes replacing the image data of the plurality of line images traced with graphic data of a plurality of line images.

28. A method for tracing an image according to claim 27, wherein said step of discriminating includes comparing a length of each continuous black pixel sequence to a fixed reference length and determining the sequence to be a portion of a line image if the determined length is less than the fixed reference length and not a portion of a line image if the determined length is greater than the reference length.

29. A method for tracing an image according to claim 28, wherein said step of determining the trace starting point determines the starting point for each line image continuous black pixel sequence as the location of substantially the center of the continuous black pixel sequence.

30. A method for tracing an image according to claim 27, wherein said step of determining the trace starting point determines the starting point for each line image continuous black pixel sequence as the location of substantially the center of the continuous black pixel sequence.

* * * * *